United States Patent [19]

Kobayashi et al.

[11] Patent Number: 4,502,975

[45] Date of Patent: Mar. 5, 1985

[54] COMPOSITIONS FOR RECOVERING AN ORGANIC MATERIAL FROM AN OILY LAYER ON A BODY OF WATER

[75] Inventors: Toshiaki Kobayashi, Tsuzuki; Yuji Kawashima, Otsu; Masafumi Yoshimura, Kuse; Masaru Sugiura; Tomio Nobe, both of Yahata; Sumio Fujimoto, Takatsuki, all of Japan

[73] Assignee: New Japan Chemical Co., Ltd., Kyoto, Japan

[21] Appl. No.: 427,141

[22] Filed: Sep. 29, 1982

[30] Foreign Application Priority Data

May 26, 1981 [JP] Japan ................................. 56-80537
Dec. 9, 1981 [JP] Japan ............................... 56-198801
Mar. 12, 1982 [JP] Japan ................................. 57-39722

[51] Int. Cl.$^3$ .......................... B01J 13/00; C02F 1/68
[52] U.S. Cl. .............................. 252/315.1; 210/922; 210/925; 252/315.3; 252/315.4
[58] Field of Search ................ 252/316, 315.1, 315.3, 252/315.4; 210/922, 925

[56] References Cited

U.S. PATENT DOCUMENTS 3,915,888 10/1975 Hoeppel ............................. 252/316
3,959,134 5/1976 Caneuari ............................ 210/925
3,969,087 7/1976 Saito et al. ........................ 252/316

FOREIGN PATENT DOCUMENTS 30476 3/1973 Japan .
34486 3/1974 Japan .
7268 8/1974 Japan .
36202 3/1976 Japan .
43555 3/1977 Japan .
98826 8/1979 Japan .
68131 4/1982 Japan .

Primary Examiner—Richard D. Lovering
Assistant Examiner—Anne Brookes
Attorney, Agent, or Firm—Armstrong, Nikaido, Marmelstein & Kubovcik

[57] ABSTRACT

This invention is directed to a composition for recovering a liquid organic material comprising:

I. about 1 to about 30 wt. % of at least one of (a) benzylidene sorbitol, benzylidene xylitol or derivatives thereof, (b) hydrogenated castor oil, (c) 12-hydroxystearic acid, (d) 9,10-dihydroxystearic acid and (e) an amide of the member (b), (c) or (d), the composition further comprising II. about 15 to about 70 wt. % of a hydrophilic solvent serving as a good solvent for the component I, and/or III. about 15 to about 80 wt. % of at least one solvent selected from the group consisting of a hydrophobic solvent having a solubility of up to 5 in water, cyclohexanone, alkylcyclohexanone, N-cyclohexyl-2-pyrrolidone and N-alkyl-2-pyrrolidone, the components II and III being conjointly present when the component I is the compounds under (a).

With use of the composition of the invention, liquid organic materials over a body of water can be effectively gelled and collected with high recovery ratio and less water content.

14 Claims, No Drawings

COMPOSITIONS FOR RECOVERING AN ORGANIC MATERIAL FROM AN OILY LAYER ON A BODY OF WATER

The present invention relates to compositions for recovering an organic material forming an oily layer on a body of water by collecting and gelling the organic material, and more particularly to a composition for collecting and gelling an oil for recovery when the oil flows out in the form of a layer or film over a body of water in rivers, ponds, drain pits, shipyard docks or the sea.

Not infrequently oils flow out or spill over the surface of water in the sea or rivers owing to accidents during navigation, errors in controlling oil supply systems, presence of oil in ballast water or breaks in oil tanks. Such oil spills cause water pollution, entailing damage to marine products, pollution of rivers, damage to fishermen and inhabitants, fire hazards, environmental destruction and like serious social problems. Accordingly various measures are taken and research efforts are made for collecting spilled oils. While the means heretofore chiefly used therefor are the combination of oil fences and adsorbing mats, and the use of emulsifying dispersants, they are not fully useful. For example, oil fences are not usable in the ocean at a distance from the coast except in special cases. The use of adsorbing mats involves a considerable hazard and difficulty in treating highly ignitable or inflammable oils, and such mats are limited in adsorbing capacity. Furthermore, emulsifying dispersants are unable to control the pollution of seawater and coast.

We have already developed a method of separating an organic material from a mixture thereof with water with use of benzylidene sorbitol (Examined Japanese Patent Publication No. 7268/1974). Utilizing a mechanism wherein benzylidene sorbitol gels or solidifies when dissolved in oil, the method uses a solution of benzylidene sorbitol in a hydrophilic solvent as an oil-water separating agent to separate oil from an aqueous phase. Although useful for recovering organic materials, the solution has the drawback that the oily fraction recovered on gelation contains water in an amount about 1 to about 5 times the oil content thereof. Moreover, the solution fails to effectively recover the gelled oil.

Accordingly, an object of the present invention is to provide an improved composition as compared with the above conventional composition for recovering organic materials.

Another object of the invention is to provide a composition for recovering gelled oil with a greatly reduced water content.

Another object of the invention is to provide a composition capable of recovering gelled oil with an efficiency of almost 100%.

Still another object of the invention is to provide a composition for forming gelled oil having a relatively high hardness to facilitate the recovery of the gelled oil.

Yet another object of the invention is to provide a composition capable of recovering gelled oil while minimizing the problem of environmental pollution.

These objects and other features of the invention will become apparent from the following description.

The present invention provides a composition for recovering a liquid organic material characterized in that the composition comprises (1) about 1 to about 30 wt.% of at least one member (hereinafter referred to as "component I") selected from the group consisting of (a) a compound represented by the formula

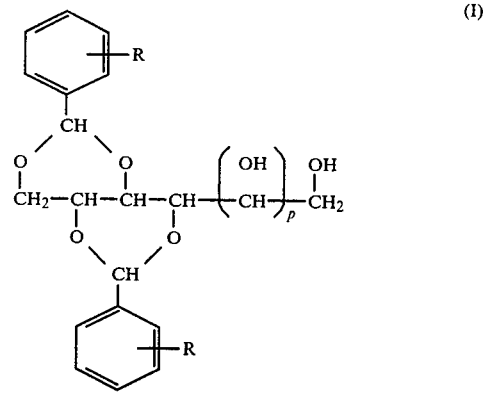

wherein R is a hydrogen atom, halogen atom, $C_1$-$C_3$ alkyl, $C_1$-$C_3$ alkoxy or nitro, and p is 0 or 1, (b) hydrogenated castor oil, (c) 12-hydroxystearic acid, (d) 9,10-dihydroxystearic acid and (e) an amide of the member (b), (c) or (d), the composition further comprising (2) about 15 to about 70 wt.% of a hydrophilic solvent (hereinafter referred to as "component II") serving as a good solvent for the component I, and/or (3) about 15 to about 80 wt.% of at least one solvent (hereinafter referred to as "component III") selected from the group consisting of a hydrophobic solvent having a solubility of up to 5 in water, cyclohexanone, alkylcyclohexanone, N-cyclohexyl-2-pyrrolidone and N-alkyl-2-pyrrolidone, the components II and III being conjointly present when the component I is the compound of the formula (I).

The composition of the invention selectively collects and solidifies an oily film of organic material formed on water, such as spilled oil on water, facilitating the separation and recovery of the material. Especially the present composition gels oil with exceedingly high selectivity, and can form a gel which is substantially free from water. The composition itself is a uniform liquid, is easily applicable to oil on water, for example, by spraying, and has another advantage of gelling such oil rapidly and uniformly without leaving ungelled oil. The gelled water thus formed has a relatively high gel hardness, drains well and can therefore be collected easily, for example, with use of a net on a tugboat. The oil component of the gel can be regenerated with ease by a simple procedure, such as dilution or distillation.

The compounds useful as the component I in this invention are those given under (a) and represented by the formula (I), such as various dibenzylidene sorbitols and dibenzylidene xylitols. Also useful are hydrogenated castor oil (b), 12-hydroxystearic acid (c), 9,10-dihydroxystearic acid (d), and amides (e) of the compound (b), (c) or (d). The amides (e) include those obtained by reacting the compound (b), (c) or (d) with a monovalent or bivalent amine in a usual manner. Examples of monovalent or bivalent amines useful for preparing such amides are ammonia, mono- or dialkylamines having $C_{1-5}$ alkyl, mono- or dialkylolamines having $C_{1-4}$ alkyl, methylenediamine, ethylenediamine, propylenediamine, etc. The amides further include bisamides. These components I-(a) to I-(e) act as gelling agents.

As will be described later, the component I-(a) produces an especially remarkable effect when used as combined with the component II and the component III. In fact, we have found for the first time that the component I-(a) achieves an outstanding result when used as combined with the component II and the component III in specified amounts.

While the components I-(b) and I-(c) are known as thickening agents, other compounds which are also known as similar thickening agents, such as stearic acid soap, 12-hydroxystearic acid soap and stearic acid bisamide, are substantially unable to act as gelling agents. Also unserviceable as gelling agents are high-melting solids, such as paraffin wax, stearic acid, myristic acid and behenic acid, which are similar to the compounds (b) to (e) in properties. We are the first to find that the components I-(b) to I-(e) function as gelling agents.

The components I-(a) to I-(e) may be used singly, or at least two of them may be used in combination. The amount of the component I to be used for producing good results is generally about 1 to about 30 wt.% based on the amount of the composition, although variable with the amounts and kinds of the other components, the kind of the organic material to be gelled, the method of application, etc. When the component I-(a) is to be used singly, it is desirable to use about 1 to about 15 wt.%, more preferably about 1 to about 9 wt.%, most preferably about 2 to about 7 wt.%, of the component I-(a). The components I-(b) to I-(e) are used preferably each in an amount of about 5 to about 25 wt.%.

The hydrophilic solvents useful as the component II according to the invention are a wide variety of those which are serviceable as good solvents for the component I. Typical of such solvents are, for example, N,N-dimethylformamide, N,N-dimethylacetamide, dimethyl sulfoxide, ethylene carbonate, solfolane, ethylene glycol methyl ether, ethylene glycol ethyl ether, ethylene glycol propyl ether, ethylene glycol butyl ether, N-methyl-2-pyrrolidone, N-ethyl-2-pyrrolidone, N-propyl-2-pyrrolidone, N,N-dimethylaminopropylmethacrylamide, N-isobutoxymethylacrylamide, N,N-dimethylacrylamide, N-vinyl-2-pyrrolidone, etc. These solvents are usable singly, or at least two of them are usable in admixture. About 15 to about 70 wt.%, preferably about 20 to about 65 wt.%, of the component II is used based on the amount of the composition.

The solvents to be used in this invention as the component III are divided generally into two types, i.e., hydrophobic solvents (component III-a) having a solubility of up to 5 in water at 20° C., and specific solvents (component III-b) including cyclohexane, alkylcyclohexanes, N-cyclohexyl-2-pyrrolidone and N-alkyl-2-pyrrolidones.

Examples of compounds useful as the component III-a are as follows.

(1) Alcohols having 6 to 20 carbon atoms, such as hexyl alcohol, heptyl alcohol, octyl alcohol, nonyl alcohol, decyl alcohol, dodecyl alcohol, tetradecyl alcohol, hexadecyl alcohol, octadecyl alcohol, oleyl alcohol, eicosyl alcohol, $C_{16-20}$ dimerized alcohols, etc.

(2) Hydrocarbons having 10 to 50 carbon atoms, such as decane, dodecane, undecane, tridecane, tetradecane, pentadecane, hexadecane, octadecane, eicosane; 1-decene, 1-dodecene, 1-undecene, 1-tetradecene, 1-pentadecene, 1-octadecene, 1-eicosene and like α-olefins having 10 to 20 carbon atoms; kerosene, liquid paraffin; etc.

(3) Esters having 6 to 40 carbon atoms, such as stearyl stearate, oleyl stearate, butyl stearate, octyl stearate, octyl benzoate, ethylene glycol distearate, propylene glycol distearate, dioctyl adipate, dioctyl sebacate, dioctyl azelate, dioctyl maleate, monoglyceride of $C_{10}$–$C_{22}$ fatty acid, diglyceride of $C_{10}$–$C_{22}$ fatty acid, dioctyl phthalate, dibutyl phthalate, dihexyl phthalate, diisodecyl phthalate, dinonyl phthalate, oleyl oleate, methyl benzoate, methyl stearate, ethyl stearate, dioctyl tetrahydrophthalate, dioctyl hexahydrophthalate, dibutyl succinate, etc.

(4) Ethers having 10 to 30 carbon atoms, such as dioctyl ether, triisobutylidene sorbitol, dimyristyl ehter, myristyl octyl ether, etc.

(5) Epoxy compounds having 10 to 56 carbon atoms, such as corresponding α-olefin epoxide, epoxidized linseed oil, epoxidized soybean oil, bisphenol A diglycidyl ether (commercially available as "Epikote 828", a product of Shell Co., U.S.A), cyclohexene oxide, epoxidized oley alcohol, epoxidized tung oil, epoxidized oleyl stearate, etc.

(6) Vegetable oils, such as coconut oil, soybean oil, linseed oil, tung oil, liquid palm oil, rapeseed oil, etc.

(7) Halogenated hydrocarbons having 1 to 20 carbon atoms, such as chloroform, tetrachloroethane, dichloroethane, alkyl halides, dibromoethane, etc.

(8) Carboxylic acids having 6 to 50 carbon atoms, such as isostearic acid, nonanoic acid, decanoic acid, dimer acid, etc.

Of these examples, alcohols, epoxy compounds, vegetable oils and carboxylic acids given under para. (1), (5), (6) and (8), respectively, are preferred.

Of the compounds useful as the component III-b, examples of alkylcyclohexanones are those having $C_{1-8}$ alkyl, such as methylcyclohexanone, ethylcyclohexanone, butylcyclohexanone, hexylcyclohexanone, etc. Examples of N-alkyl-2-pyrrolidones are those having $C_{4-18}$ alkyl, such as N-butyl-2-pyrrolidone, N-hexyl-2-pyrrolidone, N-octyl-2-pyrrolidone, N-decyl-2-pyrrolidone, N-tetradecyl-2-pyrrolidone, N-hexadecyl-2-pyrrolidone, etc. Of the compounds for the component III-b, cyclohexanone is especially suitable.

These components III-a, as well as components III-b, are used singly, or at least two of them are used in admixture. The amount of the component III to be used is about 15 to about 80 wt.%, preferably about 20 to about 75 wt.%, based on the composition. It is especially preferable to use about 20 to about 70 wt.% of the component III-a, or about 30 to about 75 wt.% of the component III-b.

As already stated, it is essential according to the invention to use the component II and the component III as combined together, when the component I-(a) is used as the gelling agent. For example, in the absence of the component III or in the presence of less than 15 wt.% of the component III in such a case, the composition is unable to gel oil on water with high selectivity for recovery, with the objectionable result that the gel obtained contains a relatively large amount of water. Conversely, when more than 80 wt.% of the component III is used, the resulting composition becomes a gel, failing to remain in the form of a liquid, and is difficult to use. When the components I-(b) to I-(e) are used as the gelling agents, one or both of the components II and III may be used in amounts within the above-specified ranges.

When desired, a surfactant can be added to the composition of the invention as a component IV. In accordance with the combination of the components II and III, the component IV eliminates the likelihood that these components will separate off when the resulting composition gels oil on water, and serves to further reduce the water content of the gelled oil. Various surfactants including usual nonionic, anionic and ampholytic surfactants are usable as the component IV. Of these, examples of especially useful surfactants are sorbitan monooleate, sorbitan monostearate and like monoalkyl esters of sorbitan; sorbitan trioleate, sorbitan tristearate and like trialkyl esters of sorbitan; ethylene oxide addition products of higher saturated or unsaturated alcohols; polyoxyethylene alkyl amides, polyoxyethylene alkyl esters, soaps, salts of higher alkyl sulfates, salts of higher alkyl ether sulfate, etc. These components IV are used singly, or at least two of them are used in combination, usually in an amount of up to about 10 wt.%, preferably about 0.2 to about 5 wt.%, more preferably about 0.5 to about 3 wt.%, based on the composition.

When desired, the composition of the invention may further incorporate, as a component V, (a) an oligomer which is liquid and has a viscosity of at least 500 cp at 20° C. (component V-a) and/or (b) a polymer (component V-b). The oligomer (a) and polymer (b) are those which can permit the composition to retain its uniformity. When the composition containing the component V is used for recovering oil, the component V imparts to the gelled oil such hardness that it will not readily break down even when caused to diffuse by a force of up to a given magnitude. When containing the component V, therefore, the present composition is advantageously usable for recovering organic materials on a very rough or wavy surface of water. Examples of the component V-a include liquid polyethers such as polyethylene glycols, polypropylene glycols, polybutylene glycols which have a molecular weight of about 300 to about 3,000; polybutene oligomers about 800 to about 3,000 in molecular weight; polybutadiene oligomers about 500 to about 3,000 in molecular weight; $C_{8-22}$ α-olefin oligomers having a polymerization degree of 2 to 4; polyester oligomers such as ethylene glycol terephathalate oligomers having a molecular weight of about 800 to about 4,000; diene oligomers such as butadiene oligomers, isoprene oligomers, piperylene oligomers, etc. which have a hydroxyl, carboxyl, halogen, amino or like functional group at the terminal end of the molecule and which have a molecular weight of about 500 to about 3,000; $C_1$-$C_4$ lower alkyl vinyl ether oligomers about 800 to about 3,000 in molecular weight. Also usable as the component V-a are acrylate oligomers or methacrylate oligomers which have $C_6$-$C_{14}$ alkyl in the ester moiety and which have a molecular weight of about 500 to about 1,000. The molecular weight of the oligomers are all indicated in terms of number average molecular weight.

Examples of the component V-b include coumarone resin, rosin, hydrogenated rosin, petroleum resin, cellulose derivatives such as methyl cellulose, ethyl cellulose, hydroxypropyl cellulose, carboxymethyl cellulose, etc. Atactic polypropylene obtained as a by-product in the production of polypropylene resin is also usable. These solid resins are preferably dissolved in a suitable solvent with heating and then uniformly admixed with the composition. The amount of the component V to be used is suitably determined in accordance with the kinds and amounts of the other components, the kind of the component V, etc. The component V-a is usually used in an amount up to about 30 wt.%, based on the amount of the composition. Generally when more than 30 wt.% of the component V-a is present in the composition, the composition is likely to have too high a viscosity and become difficult to handle. Usually it is desirable to use about 1 to about 20 wt.% of the component V-a. The component V-b is used in a smaller amount, usually up to about 5 wt.%, preferably about 1 to about 3 wt.%.

Further according to the invention, it is possible to use a known gelling agent additionally as a component VI when so desired. Examples of useful known gelling agents are N-acylamino acid amides, N-acylamino acid amine salts and N-acylamino acid esters. With these N-acylamino acid amides or N-acylamino acid amine salts, it is desired that the acyl group have 2 to 18 carbon atoms and that the amine component be ammonia or $C_{1-18}$ alkylamines. Further with the N-acylamino acid esters, it is preferred that the acyl be the same as above and that the alcohol component constituting the ester have $C_{8-18}$ alkyl. Example of amino acids constituting these agents are glutamic acid, inosinic acid, etc. The known gelling agent to be used additionally is used in an amount of about 2 to about 30 wt.%, preferably about 3 to about 25 wt.%, based on the resulting composition. In this case, the specified gelling agent, namely the component I such as hydrogenated castor oil, is used in an amount of about 2 to about 25 wt.%, preferably about 3 to about 20 wt.%, based on the composition. Most suitably, the combined amount of the component I and known gelling agent is about 4 to about 30 wt.%.

According to the invention, a halide, sulfate, carbonate, nitrate on hydroxide of pottasium, sodium, lithium, calcium, magnesium, aluminum or like metal can be added as desired to the composition, to thereby improve the storage stability of the composition. The metal salt is used usually in an amount between 2 wt.% and such amount that the resulting composition can be liquid at room temperature.

Given below are examples of preferred compositions embodying the present invention.
(1) Composition comprising:
   (1) about 1 to about 15 wt.% of component I-(a),
   (2) about 15 to about 70 wt.% of component II, and
   (3) about 15 to about 80 wt.% of component III.
(2) Composition comprising:
   (1) about 3 to about 11 wt.% of component I-(a),
   (2) about 20 to about 65 wt.% of component II,
   (3) about 20 to about 75 wt.% of component III, and
   (4) about 0.5 to about 3 wt.% of component IV.
(3) Composition comprising:
   (1) about 3 to about 11 wt.% of component I-(a),
   (2) about 20 to about 65 wt.% of component II,
   (3) about 20 to about 75 wt.% of component III,
   (4) about 0.5 to about 3 wt.% of component IV, and
   (5) about 1 to about 20 wt.% of component V-a and/or about 1 to about 3 wt.% of component V-b.
(4) Composition comprising:
   (1) about 2 to about 30 wt.% of at least one of components I-(b) to I-(e),
   (2) about 15 to about 70 wt.% of component II, and
   (3) about 15 to about 80 wt.% of component III.
(5) Composition comprising:
   (1) about 2 to about 25 wt.% of component I,
   (2) about 20 to about 65 wt.% of component II,
   (3) about 20 to about 75 wt.% of component III, (4) about 0.5 to about 3 wt.% of component IV,
(5) about 1 to about 20 wt.% of component V-(a), and/or about 1 to about 3 wt.% of component V-(b), and
(6) about 2 to about 25 wt.% of component VI, the combined amount of components I and VI being about 4 to about 30 wt.%.

(6) Composition comprising:
(1) about 5 to about 15 wt.% of component I,
(2) about 35 to about 65 wt.% of component II, and
(3) about 35 to about 75 wt.% of component III.

The composition of the invention can be prepared merely by mixing predetermined quantities of the desired components. The mixing can be done by stirring in a usual manner. The components will be mixed together uniformly within a shorter period of time when heated slightly.

Like known compositions of this type for recovering organic materials, the present compositions are useful for gelling and recovering organic materials such as oil spilled on water, food oils, etc. Examples of organic materials to be gelled and recovered by the compositions of the invention are crude oils, A fuel oil, B fuel oil and C fuel oil according to JIS K 2205, naphtha, kerosene, dioctyl phthalate, dihexyl phthalate and like phthalates, lubricating oils, higher alcohols, gasoline, ethyl acetate, benzene, toluene, xylene, alkylbenzenes, aniline, paraffin, α-olefins, epoxides, phenols, organic halides, nitro compounds, animal and vegetable oils, amines, nitriles, ketones, methyl esters of animal or vegetable oils, etc. Such an organic material is gelled by the present composition for recovery by the usual method, i.e. by applying the composition to the organic material by injection or spraying. When needed, the composition can be applied to the organic material along with water. While the amount of the composition to be applied is variable depending on the kinds and proportions of the components of the composition, the kind of the organic material to be treated and other conditions, good results can usually be achieved by using the composition in such an amount that the organic material will be fully gelled for recovery. For example, fuel oils, crude oils, vegetable or animal oils and like viscous organic materials can be treated satisfactorily usually with use of about 10 to about 60 vol.%, preferably about 20 to about 50 vol.%, of the composition based on the amount of the organic material. Further, naphtha, kerosene, toluene and like relatively less viscous organic materials can be treated sufficiently generally with use of about 10 to about 40 vol.% of the composition.

When applied, the present composition gels (solidifies) the organic material rapidly and almost completely. When it is applied to a film or layer of oil on water, the oil film or layer only is selectively collected and gelled. The resulting gell is in the form of a mass or masses having high hardness, which can be collected very easily, for example, with a net. From the gelled oil collected, the oil can be regenerated by dilution, distillation or like conventional method.

Thus the present invention provides effective and economical compositions and method by which an oil film or layer of organic material over the surface of water, such as oil spilled on water, can be gelled for selectively collecting the oily material only. Thus the invention affords a novel technique which is very useful for solving the problem of spilled oil.

The present invention will be described in detail with reference to the following examples and comparison examples, in which the gel hardness, water content and recovery ratio were measured by the following methods.

1. Gel hardness

One end of a round rod having an end surface area of 1 cm$^2$ was placed on a sample of the gel, which was then subjected to a progressively increasing load at a rate of 10 g/sec. The load under which the gel completely collapsed was measured as the hardness of the gel.

2. Water content

Measured by Karl Fischer's method.

3. Recovery ratio

Calculated from the following equation.

$$\text{Recovery ratio (\%)} = \frac{C(1 - W/100)}{A + B} \times 100$$

wherein A is the weight of the composition used, B is the weight of oil to be treated, C is the weight of gelled oil collected, and W is the water content measured in 2 above.

EXAMPLE 1

Dibenzylidene xylitol: 3 wt.%
N,N-Dimethylacetamide: 20 wt.%
Cyclohexanone: 77 wt.%

These three compounds were stirred at 35° C. and thereby mixed together to prepare a composition of the invention.

A 5 l quantity of A fuel oil was placed into a container measuring 1×1×1 m$^3$ and containing 500 l of seawater. While ruffling the oil layer, 1.5 l of the foregoing composition was sprayed over the oil layer over a period of 10 minutes. The gelled oil obtained 10 minutes after the application was scooped with a net having 2 mm×2 mm mesh openings. The hardness and water content of the gel and oil recovery ratio were measured with the following results.

Hardness: 130 g/cm$^2$
Water content: 0.2%
Recovery ratio: 99%

EXAMPLE 2

Dibenzylidene sorbitol: 5 wt.%
N-Methyl-2-pyrrolidone: 74 wt.%
Liquid palm oil: 20 wt.%
Polyoxyethylene lauryl alcohol ether (with 3 moles of ethylene oxide added): 1 wt.%

These four compounds were mixed together by stirring at room temperature to prepare a composition of the invention.

A 5 l quantity of kerosene was placed into the same container as the one used in Example 1 and containing 500 l of seawater. While ruffling the oil layer, 1.0 l of the composition was sprayed over the oil layer over a period of 5 minutes. The gelled oil obtained 10 minutes after the completion of application was scooped with a net with 3 mm×3 mm mesh openings, and thereafter tested in the same manner as in Example 1. The results are as follows.

Hardness: 280 g/cm$^2$
Water content: 1%
Recovery ratio: 100%

EXAMPLE 3

Di-(p-methylbenzylidene) sorbitol: 6 wt.%

Sulfolane: 56 wt.%
Decyl alcohol: 35 wt.%
"Span 60" (nonionic surfactant produced by Kao Atlas Co., Ltd., Japan): 3 wt.%

These four components were stirred at room temperature and thereby mixed together to prepare a composition of the invention.

A 0.5 l quantity of gasoline was placed into the same container as the one used in Example 1 and containing 500 l of water to form an oil film. A 0.1 l of the composition was sprayed onto the film over a period of 5 minutes. Ten minutes after the application, the oil film gelled with its area reduced to about 1/50 the initial area. The gelled oil was scooped with a net having mesh openings of 3 mm×3 mm, and tested in the same manner as in Example 1. The results are as follows.

Hardness: 350 g/cm$^2$
Water content: 0.3%
Recovery ratio: 95%

These two compounds were mixed together by stirring at room temperature to prepare a comparison composition.

A 5 l quantity of A fuel oil was placed into the same container as the one used in Example 1 and containing 500 l of seawater. While ruffling the oil layer, 2 l of the comparison composition was sprayed over the oil layer over a period of 10 minutes. The oil layer was checked for gelation 30 minutes after the application. The oil had been gelled in a small amount with gelation chiefly taking place only in the aqueous layer. The gelled water had hardness of 600 g/cm$^2$, while the fuel oil was collected as a gel with a recovery ratio of about 10%.

EXAMPLE 4

Composition specimens No. 1 to No. 17 were prepared according to the invention in the same manner as in Example 1 using the components listed in Table 1 below.

TABLE 1

| Specimen No. | I | | II | | III | | IV | |
|---|---|---|---|---|---|---|---|---|
| 1 | DBS | 9 | DMAc<br>NMP | 50<br>20 | C$_{14}$ α-Olefin epoxide | 21 | — | |
| 2 | DBS | 6 | DMF<br>DMSO | 14<br>5 | Cyclohexanone | 75 | — | |
| 3 | DBS | 2 | DMF | 39 | C$_{8-12}$ Alcohol | 50 | C$_{12}$ Alcohol-EO (2 moles) adduct | 9 |
| 4 | DBS | 5 | DMF<br>DMSO | 20<br>30 | C$_{16-18}$ α-Olefin | 42 | Sorbitan monooleate | 3 |
| 5 | DBS | 3 | DMF<br>NMP<br>Ethylene carbonate | 25<br>7<br>7 | Dioctyl phthalate<br>Cyclohexanone | 40<br>15 | Sodium salt of C$_{12-14}$ alkyl sulfate | 3 |
| 6 | DBS | 2 | NMP | 20 | Oleyl oleate<br>N—Butyl-2-pyrrolidone | 17<br>60 | Soap | 1 |
| 7 | Me—DBS | 3 | DMF<br>N—Propyl-2-pyrrolidone | 10<br>30 | Isostearic acid | 57 | — | |
| 8 | Me—DBS | 7 | DMSO | 17 | Benzyl alcohol | 70 | Glycerin monostearate | 6 |
| 9 | Cl—DBS | 3 | N—Vinyl pyrrolidone<br>DMF<br>DMSO | 10<br>30<br>10 | Rapeseed oil | 42 | Coconut oil fatty acid diethanolamide | 5 |
| 10 | Me—DBX | 5 | DMAc<br>NMP<br>Ethylene glycol methyl ether | 20<br>40<br>5 | Decyl ether | 30 | — | |
| 11 | NO$_2$—DBX | 4 | DMF<br>N—Isobutoxy-methylacrylamide | 50<br>10 | Epikote 828 | 46 | — | |
| 12 | Et—DBS | 2 | N,N—Dimethylacrylamide<br>DMSO | 30<br>10 | Butylcyclohexanone | 52 | Sorbitan dioleate | 1 |
| 13 | Pr—DBS | 5 | NMP<br>Sulfolane | 30<br>20 | C$_{12}$ Alkyl chloride<br>Linseed oil | 30<br>15 | — | |
| 14 | Pr—DBX | 3 | DMAc<br>N—Ethyl-pyrrolidone | 35<br>15 | Eicosane<br>Propylene glycol distearate | 20<br>26 | Sodium salt of C$_{14}$ alcohol-EO (2 moles) adduct sulfate | 1 |
| 15 | Cl—DBX | 3 | DMF<br>DMSO | 20<br>22 | Oleyl alcohol | 50 | — | |
| 16 | MeO—DBS | 5 | DMAc<br>DMSO | 10<br>40 | Dioctyl maleate | 44 | C$_9$ Alkyl phenol-EO (10 moles) adduct | 1 |
| 17 | MeO—DBX | 3 | DMAc<br>DMSO | 10<br>40 | Dioctyl adipate | 44 | C$_{12}$ Alcohol-EO (12 moles) adduct | 1 |

COMPARISON EXAMPLE 1

Dibenzyliden sorbitol: 15 wt.%
N,N-Dimethylacetamide: 85 wt.%

The abbreviations in Table 1 represent the following.

Component I

DBS—dibenzylidene sorbitol (1,3:2,4-isomer)
Me-DBS—di-(p-methylbenzylidene)sorbitol Cl-DBS—di-(p-chlorobenzylidene)sorbitol
Me-DBX—di-(p-methylbenzylidene)xylitol
NO$_2$-DBX—di-(p-nitrobenzylidene)xylitol
Et-DBS—di-(p-ethylbenzylidene)sorbitol
Pr-DBS—di-(p-propylbenzylidene)sorbitol
Pr-DBX—di-(p-propylbenzylidene)xylitol
Cl-DBX—di-(p-chlorobenzylidene)xylitol
MeO-DBS—di-(p-methoxybenzylidene)sorbitol
MeO-DBX—di-(p-methoxybenzylidene)xylitol Component II DMAc—N,N-dimethylacetamide
NMP—N-methyl-2-pyrrolidone
DMF—N,N-dimethylformamide
DMSO—dimethyl sulfoxide Component IV EO—ethylene oxide The specimens (No. 1 to No. 17) listed in Table 1 were tested for the collection of A fuel oil in the same manner as in Example 1, and the resulting gels were checked for water content and recovery ratio. The results obtained were comparable to those achieved in Example 1. The spilled oil can be collected very advantageously with use of the compositions of the invention.

EXAMPLE 5

Dibenzylidene sorbitol: 3 wt.%
N,N-Dimethylacetamide: 20 wt.%
Cyclohexanone: 70 wt.%
Polybutene oligomer (number average molecular weight: 1500): 7 wt.%

These four components were mixed together by stirring at 35° C. to prepare a composition of the invention. This composition will be referred to as "composition A".

A 5 l quantity of A fuel oil was placed into a container measuring $1 \times 1 \times 1$ m$^3$ and containing 500 l of seawater, 1.5 l of the composition was poured into the container, and the mixture was stirred for 5 minutes at a speed listed below. After allowing the mixture to stand for 2 minutes subsequently, the resulting gelled oil was scooped with a net having 2 mm $\times$ 2 mm mesh openings and then tested for hardness, water content and oil recovery ratio.

The composition obtained in the same manner as above with the exception of containing no polybutene oligomer but containing 77 wt.% of cychlohexanone, was similarly tested. This composition will be referred to as "composition B".

Table 2 shows the results.

TABLE 2

| Composition | A | | B | |
|---|---|---|---|---|
| Stirring speed (r.p.m.) | 20 | 150 | 20 | 150 |
| Hardness (g/cm$^2$) | 140 | 140 | 130 | 80 |
| Water content (%) | 7 | 7 | 10 | 10 |
| Recovery Ratio (%) | 99 | 99 | 99 | 70 |

Table 2 shows that when the oil was treated with the composition B prepared according to theinvention and free from the component V (polybutene oligomer), at a very high stirring speed of 150 r.p.m. (to simulate a rough water surface), the gel once formed was partly collapsed by the force of high-speed stirring to result in a lower recovery ratio. However, when the oil was similarly treated at a low stirring speed of 20 r.p.m. (to simulate a placid or less wavy water surface), the oil was collected with a recovery ratio of 99% in the form of platelike gel blocks having high hardness. Further when the composition A according to the invention and containing the component V (polybutene oligomer) was used, the oil was collected with a recovery ratio of 99% in the form of platelike gell blocks having high hardness, irrespective of the stirring condition (i.e. water surface condition). This indicates that the use of the component V gives the gelled oil hardness to withstand the external force, for example, of waves against breakdown to assure ease of collection.

EXAMPLE 6

Dibenzylidene xylitol: 5 wt.%
N-Methyl-2-pyrrolidone: 60 wt.%
Dioctyl maleate: 14 wt.%
Polybutadiene oligomer with terminal hydroxyl group (molecular weight: 2000): 20 wt.%
Polyoxyethylene lauryl alcohol ether (with 5 moles EO added): 1 wt.%

The five components were mixed together by stirring at room temperature to prepare a composition of the invention. This composition will be referred to as "composition A".

Separately the same composition as above was prepared according to the invention with the exception of using 34 wt.% of dioctyl maleate and not using the above polybutadiene oligomer. This composition will be referred to as "composition B".

The compositions A and B were tested in the same manner as in Example 5 at a stirring speed of 150 r.p.m. Table 3 shows the results.

TABLE 3

| Composition | A | B |
|---|---|---|
| Hardness (g/cm$^2$) | 250 | 100 |
| Water content (%) | 1 | 1 |
| Recovery ratio (%) | 100 | 60 |

Table 3 reveals that the presence of the component V (polybutadiene oligomer with terminal hydroxyl group) enables the composition to form a gel with high hardness even under the severe condition of 150 r.p.m. and to collect the oil with a recovery ratio of 100%.

EXAMPLE 7

Di-(p-methylbenzylidene) sorbitol: 4 wt.%
Dimethyl sulfoxide: 40 wt.%
N,N-Dimethylformamide: 10 wt.%
Decyl alcohol: 30 wt.%
Methyl vinyl ether oligomer (molecular weight: 3000): 10 wt.%
Sorbitan monostearate: 6 wt.%

These six components were mixed together by stirring at room temperature to prepare a composition of the invention. This composition will be referred to as "composition A".

Separately a composition was prepared according to the invention in the same manner as above with the exception of using 40 wt.% of decyl alcohol and not using methyl vinyl ether oligomer. The composition will be referred to as "composition B".

These compositions were tested for the collection of oil at a stirring speed of 150 r.p.m. in the same manner as in Example 5 except that kerosene was used in place of A fuel oil. Table 4 shows the results.

TABLE 4

| Composition | A | B |
| --- | --- | --- |
| Hardness (g/cm$^2$) | 105 | 90 |
| Water content (%) | 2 | 2 |
| Recovery ratio (%) | 100 | 65 |

Table 4 reveals the effect achieved by the presence of the component V (methyl vinyl ether oligomer).

EXAMPLE 8

Composition specimens No. 1 to No. 10 according to the invention were prepared from the components listed in Table 5 below in the same manner as in Example 5. Abbreviations used in Table 5 have the same meaning as those used in Table 1.

TABLE 5

| Specimen No. | I | | II | | III | | IV | | V | |
| --- | --- | --- | --- | --- | --- | --- | --- | --- | --- | --- |
| 1 | DBS | 9 | DMAc NMP | 49 20 | C$_{14}$ α-Olefin oxide | 21 | — | | Methyl cellulose | 1 |
| 2 | DBS | 6 | DMF DMSO | 14 5 | Cyclohexanone | 74 | — | | Hydroxypropyl cellulose | 1 |
| 3 | DBS | 2 | DMF | 39 | C$_{8-18}$ Alcohol mixture | 45 | C$_{12}$ Alcohol-EO (2 moles) adduct | 9 | C$_{12}$ α-Olefin oligomer (mol. wt. 500) | 5 |
| 4 | DBS | 5 | DMF DMSO | 20 30 | Oleic acid | 20 | Sorbitan monooleate | 3 | Liquid polybutadiene oligomer (mol. wt. 3000) | 4 |
| 5 | Me—DBS | 4 | DMF NPP$^1$ | 10 30 | Isostearic acid | 20 | Soap | 1 | Liquid polybutene oligomer (mol. wt. 2500) | 36 |
| 6 | Me—DBS | 2 | DMSO | 17 | Benzyl alcohol C$_{14}$ α-Olefin dimer | 50 18 | — | | Atactic polypropylene$^3$ | 2 |
| 7 | Cl—DBS | 3 | DMF DMSO | 30 20 | Dimer of tall oil fatty acid | 38 | Glycerin monostearate | 4 | Polyester oligomer (mol. wt. 3000) | 5 |
| 8 | Et—DBS | 5 | DMA$^2$ DMSO | 30 10 | Butylcyclohexanone | 45 | Coconut oil fatty acid diethanolamide | 3 | Polyisopropyl vinyl ether (mol. wt. 1000) | 7 |
| 9 | Me—DBX | 5 | DMAc Methyl cellosolve | 20 45 | Decyl ether | 26 | — | | Liquid polypropylene glycol (mol. wt. 1000) | 4 |
| 10 | MeO—DBS | 4 | DMAc DMSO | 10 40 | Dioctyl adipate | 40 | Sodium salt of C$_{14}$ alcohol-EO (2 moles) adduct sulfate | 1 | Butadiene oligomer with carboxyl groups at both terminal ends (mol. wt. 4000) | 5 |

$^1$NPP signifies N—propyl-2-pyrrolidone.
$^2$DMA means N,N—dimethylacrylamide.
$^3$obtained as by-product in the production of polypropylene resin The specimens (No. 1 to No. 10) listed in Table 5 were tested for the collection of A fuel oil in the same manner as in Example 5, and the resulting gels were checked for water content and oil recovery ratio. The results were all similarly satisfactory. The spilled oil can be collected very advantageously with use of the compositions of the invention containing the component V, irrespective of the stirring condition, i.e. the roughness of water surface as in the sea.

EXAMPLE 9

12-Hydroxystearic acid: 20 wt.%
Dimethylformamide: 40 wt.%
Kerosene: 40 wt.%

These three compounds were mixed together by stirring to prepare a composition of the invention.

A 4 l quantity of seawater and 400 ml of B fuel oil were placed into a vat measuring 23 cm×34 cm×23 cm, and the contents were mixed together with a rotary blade at 50 r.p.m. A 120 ml quantity of the above composition was injected into the mixture with a syringe having a nozzle. After mixing the contents for 5 minutes, the resulting gel was scooped with a net having 2 mm×2 mm mesh openings and then checked for hardness, water content and recovery ratio. The results are as follows.

Hardness: 20 g/cm$^2$
Water content: 17%
Recovery ratio: 100%

EXAMPLE 10

12-Hydroxystearic acid: 10 wt.%
Dibenzylidene sorbitol: 10 wt.%
Dimethylformamide: 40 wt.%
Kerosene: 40 wt.%

These four compounds were mixed together in the same manner as in Example 9 to prepare a composition of the invention. The composition was tested in the same manner as in Example 9, with the following results.

Hardness: 30 g/cm$^2$
Water content: 13%
Recovery ratio: 100%

EXAMPLE 11

12-Hydroxystearic acid: 20 wt.%
Dibenzylidene sorbitol: 5 wt.%
Dimethylformamide: 40 wt.%
Cyclohexanone: 35 wt.%

These four compounds were mixed together by stirring to prepare a composition of the invention. The composition was tested in the same manner as in Example 9 except that kerosene was used in place of B fuel oil. The resutls are as follows.

Hardness: 45 g/cm$^2$
Water content: 20%

Recovery ratio: 100%

EXAMPLES 12 AND 13

| Component | Example 12 | Example 13 |
|---|---|---|
| 9,10-Dihydroxystearic acid amide | 8 wt. % | 8 wt. % |
| N—Lauroylglutamic acid dibutylamide | — | 12 wt. % |
| Ethylene glycol butyl ether | 23 wt. % | 20 wt. % |
| Dimethylformamide | 23 wt. % | 20 wt. % |
| Liquid n-paraffin | 46 wt. % | 40 wt. % |

In each example, the compounds were mixed together by stirring to obtain a composition of the invention.

In the same manner as in Example 9 with the exception of using 2-ethylhexanol in place of B fuel oil, 120 ml of the composition was sprayed on 2-ethylhexanol on seawater. A 200 ml quantity of seawater was thereafter injected into the resulting mixture. Thereafter following the same procedure as in Example 9, the 2-ethylhexanol was gelled and collected with the following results.

| | Example 12 | Example 13 |
|---|---|---|
| Hardness (g/cm$^2$) | 10 | 15 |
| Water content (%) | 25 | 30 |
| Recovery ratio (%) | 95 | 100 |

COMPARISON EXAMPLE 2

The same test procedure as in Example 13 was repeated except that a composition was prepared from the following components without using 9,10-dihydroxystearic acid amide.
N-Lauroylglutamic acid dibutylamide: 12 wt.%
Ethylene glycol butyl ether: 22 wt.%
Dimethylformamide: 22 wt.%
Liquid n-paraffin: 44 wt.%
As a result, the amide in the composition dissolved in 2-ethylhexanol, and no gel was formed.

EXAMPLE 14

The following compounds were mixed together by stirring to prepare a composition of the invention.
Hydrogenated castor oil: 5 wt.%
methylenebisamide of 12-hydroxy-stearic acid: 10 wt.%
Di-(p-methylbenzylidene)sorbitol: 3 wt.%
Dimethylacetamide: 50 wt.%
n-Octanol: 32 wt.%
A 1.5 l quantity of the above composition and 0.5 l of water were placed at the same time into a vat measuring 70 cm×70 cm×70 cm and containing 3 l of spoiled vegetable oil (a mixture of soybean oil and rapeseed oil). In 5 seconds, the mixture gelled and became no longer flowable. The gel had the following properties.
Hardness: 220 g/cm$^2$
Water content: 10%
Recovery ratio: 100%

EXAMPLE 15

The following compounds were mixed together by stirring to prepare a composition of the invention.
Methylenebisamide of 12-hydroxystearic acid: 25 wt.%
Dibenzylidene sorbitol: 3 wt.%
Dimethyl sulfoxide: 50 wt.%
Stearyl stearate: 22 wt.%
The test procedure of Example 9 was repeated with use of 50 ml of the composition. The results are as follows.
Hardness: 25 g/cm$^2$
Water content: 30%
Recovery ratio: 100%

EXAMPLE 16

The following components were mixed together by stirring to prepare a composition of the invention.
12-Hydroxystearic acid: 3 wt.%
N-Stearylglutamic acid dibutylamide: 18 wt.%
Calcium chloride: 3 wt.%
Polybutene oligomer (molecular weight: 1500): 1 wt.%
sec-Octanol: 50 wt.%
Liquid n-paraffin: 25 wt.%
The procedure of Example 9 was repeated with the exception of using 300 ml of the above composition to form a gel, which was then collected. The results are as follows.
Hardness: 60 g/cm$^2$
Water content: 25%
Recovery ratio: 100%

We claim:
1. An organic material gelling and recovering composition for recovering a liquid organic material on a body of water comprising:
I. about 1 to about 30 wt.% of at least one member select from the group consisting of:
(a) a compound represented by the formula

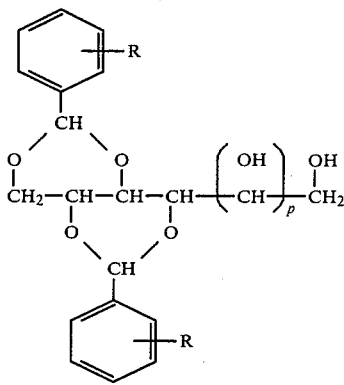

(I)

wherein R is hydrogen atom, halogen atom, lower alkyl, lower alkoxy or nitro, and p is 0 or 1,
(b) hydrogenated castor oil,
(c) 12-hydroxystearic acid,
(d) 9,10-dihydroxystearic acid, and
(e) an amide of the member (b), (c) or (d),
the composition further comprising at least one of
II. about 15 to about 70 wt.% of a hydrophilic solvent serving as a good solvent for the component I, and selected from the group consisting of N,N-dimethylformamide, N,N-dimethylacetamide, dimethylsulfoxide, ethylene carbonate, sulfolane, ethylene glycol methyl ether, ethylene glycol ethyl ether, ethylene glycol propyl ether, ethylene glycol butyl ether, N-methyl-2-pyrrolidone, N-ethyl-2-pyrrolidone, N-propyl-2-pyrrolidone, N,N-dimethylacrylamide, N-vinyl-2-pyrrolidone, N,N-dimethylaminopropylmethacrylamide, and N-isobutoxymethylacrylamide, and III. about 15 to about 80 wt.% of at least one solvent selected from the group consisting of a hydrophobic solvent having a solubility of up to 5 g in 100 g of water, cyclohexanone, alkylcyclohexanone, N-cyclohexyl-2-pyrrolidone and N-$C_4$-$C_{18}$ alkyl-2-pyrrolidone, wherein components II and III are conjointly present when the component I is the compound of the formula (I).

2. A composition as defined in claim 1 which further comprises as a component IV about 0.2 to about 5 wt.% of at least one of nonionic surfactant, anionic surfactant and ampholytic surfactant.

3. A composition as defined in claim 2 which comprises
(1) about 3 to about 11 wt.% of the component I-(a),
(2) about 20 to about 65 wt.% of the component II,
(3) about 20 to about 75 wt.% of the component III, and
(4) about 0.5 to about 3 wt.% of the component IV.

4. A composition as defined in claim 1 or 2 which further comprises as a component IV about 2 to about 30 wt.% of at least one compound selected from the group consisting of N-acylamino acid amides, N-acylamino acid amine salts and N-acylamino acid esters.

5. A composition as defined in claim 1 or 2 which further comprises, as a component V, (a) about 1 to about 20 wt.% of an oligomer which is liquid and has a viscosity of at least 500 cp at 20° C., and/or (b) about 1 to about 3 wt.% of a polymer selected from the group consisting of coumarone resin, rosin, hydrogenated rosin, petroleum resin, cellulose derivative and atactic polypropylene.

6. A composition as defined in claim 5 which comprises
(1) about 3 to about 11 wt.% of the component I-(a),
(2) about 20 to about 65 wt.% of the component II,
(3) about 20 to about 75 wt.% of the component III,
(4) about 0.5 to about 3 wt.% of the component IV, and
(5) about 1 to about 20 wt.% of the component V-(a), and/or about 1 to about 3 wt.% of the component V-(b).

7. A composition as defined in claim 5 which further comprises as a component VI about 2 to about 30 wt.% of at least one compound selected from the group consisting of N-acylamino acid amides, N-acylamino acid amine salts and N-acylamino acid esters.

8. A composition as defined in claim 7 which comprises
(1) about 2 to about 25 wt.% of the component I,
(2) about 20 to about 65 wt.% of the component II,
(3) about 20 to about 75 wt.% of the component III,
(4) about 0.5 to about 3 wt.% of the component IV,
(5) about 1 to about 20 wt.% of the component V-(a), and/or about 1 to about 3 wt.% of component V-(b), and
(6) about 2 to about 25 wt.% of the component VI, the combined amount of the components I and VI being about 4 to about 30 wt.%.

9. A composition as defined in claim 1 wherein the component III is a hydrophobic solvent having a solubility of up to 5 g in 100 g of water at 20° C.

10. A composition as defined in claim 9 wherein the hydrophobic solvent is selected from the group consisting of alcohols having 6 to 20 carbon atoms, hydrocarbons having 10 to 50 carbon atoms, esters having 6 to 40 carbon atoms, ethers having 10 to 30 carbon atoms, epoxy compounds having 10 to 56 carbon atoms, vegetable oils, halogenated hydrocarbons having 1 to 20 carbon atoms and carboxylic acids having 6 to 50 carbon atoms.

11. A composition as defined in claim 1 wherein the component III is selected from cyclohexanone, alkylcyclohexanones having alkyl with 1 to 8 carbon atoms and N-alkyl-2-pyrrolidones having alkyl with 4 to 18 carbon atoms.

12. A composition as defined in claim 1 which comprises
(1) about 1 to about 15 wt.% of the component I-(a),
(2) about 15 to about 70 wt.% of the component II, and
(3) about 15 to about 80 wt.% of the component III.

13. A composition as defined in claim 1 which comprises
(1) about 2 to about 30 wt.% of at least one of the components I-(b) to I-(e),
(2) about 15 to about 70 wt.% of the component II, and
(3) about 15 to about 80 wt.% of the component III.

14. A composition as defined in claim 1 which comprises
(1) about 5 to about 15 wt.% of the component I,
(2) about 35 to about 65 wt.% of the component II, and
(3) about 35 to about 75 wt.% of the component III.

* * * * *